(12) United States Patent
Takayama

(10) Patent No.: US 6,970,192 B2
(45) Date of Patent: Nov. 29, 2005

(54) IMAGING APPARATUS WITH SELECTIVE ALLOCATION OF FIRST AND SECOND IMAGE DATA BASED ON OPERATION INSTRUCTION

(75) Inventor: Nobutoshi Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/393,736

(22) Filed: Mar. 21, 2003

(65) Prior Publication Data

US 2003/0189652 A1    Oct. 9, 2003

(30) Foreign Application Priority Data

Apr. 5, 2002    (JP) .............................. 2002-103934

(51) Int. Cl.⁷ .............................................. H04N 5/76

(52) U.S. Cl. .................. 348/231.2; 348/36; 348/218.1; 348/222.1

(58) Field of Search .......................... 348/231.6, 207.1, 348/333.05, 231.2, 36, 218.1, 222.1

(56) References Cited

U.S. PATENT DOCUMENTS

| | | | |
|---|---|---|---|
| 5,633,678 A * | 5/1997 | Parulski et al. | 348/231.5 |
| 5,903,309 A * | 5/1999 | Anderson | 348/333.02 |
| 6,101,506 A * | 8/2000 | Ukai et al. | 707/203 |
| 6,118,925 A * | 9/2000 | Murata et al. | 386/83 |
| 6,169,575 B1 * | 1/2001 | Anderson et al. | 348/231.2 |
| 2003/0025806 A1 * | 2/2003 | Ohmura et al. | 348/231.6 |

* cited by examiner

Primary Examiner—Thai Tran
Assistant Examiner—Gary C. Vieaux
(74) Attorney, Agent, or Firm—Cowan, Liebowitz & Latman. P.C.

(57) ABSTRACT

An imaging apparatus for recording image data picked up by an image pickup unit until a recording medium is presented. In response to an instruction from an instruction operation unit capable of arbitrary instruction, a first image data picked up by the image pickup unit is allocated to the same group as a second image data photographed immediately before the first image data so as to allocate the first image data to the same group as the image data picked up immediately before the first image data. In addition, management information containing group information that shows image data within the group is generated.

21 Claims, 13 Drawing Sheets

| FIG. 2A |
|---|
| FIG. 2B |

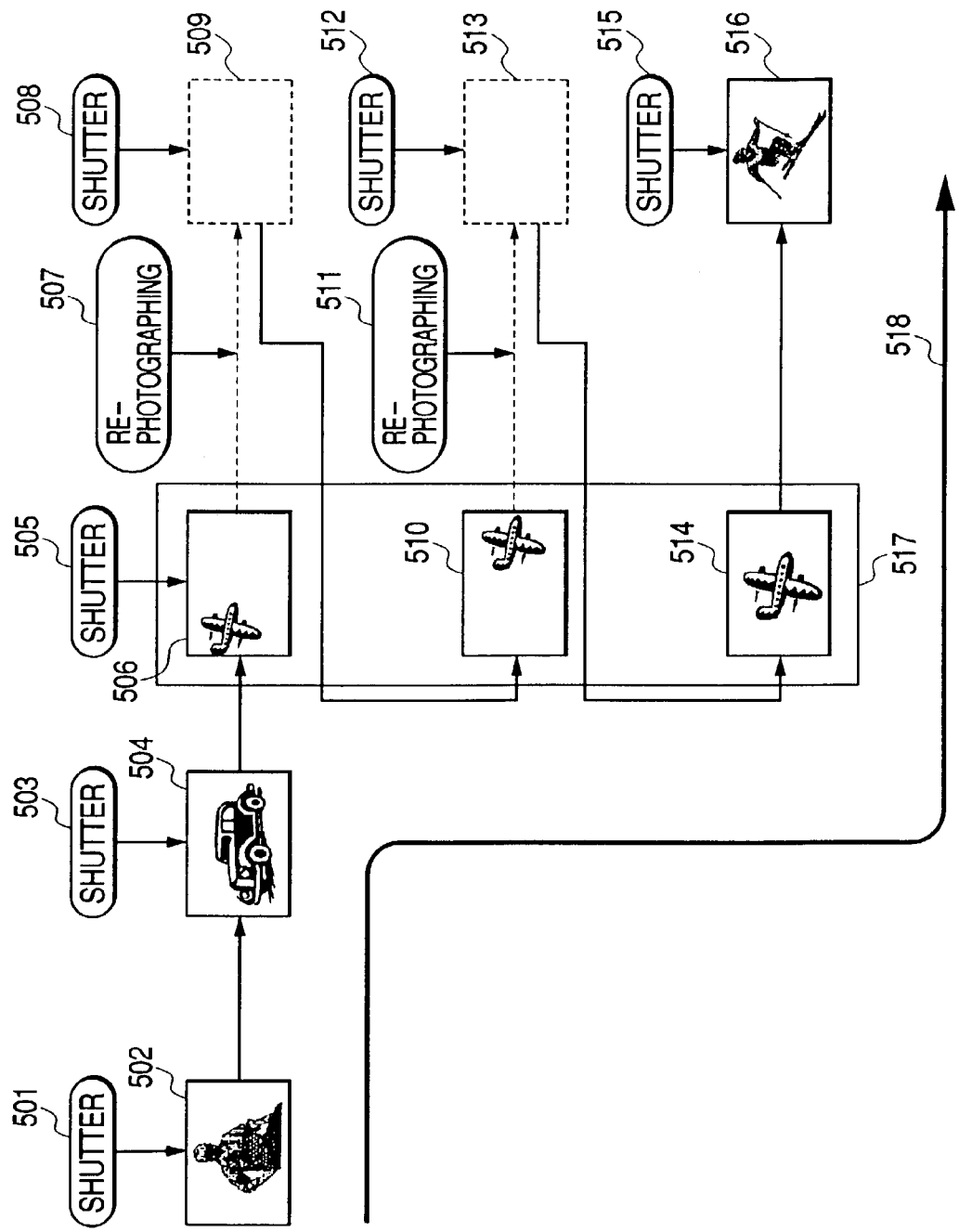

FIG. 6

| DATA BLOCK NAME | DATA CONTENTS |
|---|---|
| INFORMATION OF TABLE OF CONTENTS OF FILE | POSITION AND INFORMATION AMOUNT OF CONTENTS INFORMATION BLOCK |
| FILE MANAGEMENT INFORMATION | IMAGE FILE ID AND GROUP ID IN ORDER OF PHOTOGRAPHING |
| GROUP INFORMATION | GROUP ID AND INFORMATION OF KIND OF GROUP |
| INTRA-GROUP FILE INFORMATION 01 | IMAGE FILE IDS AND REPRESENTATIVE IMAGE FILE ID |
| INTRA-GROUP FILE INFORMATION 02 | IMAGE FILE IDS AND REPRESENTATIVE IMAGE FILE ID |

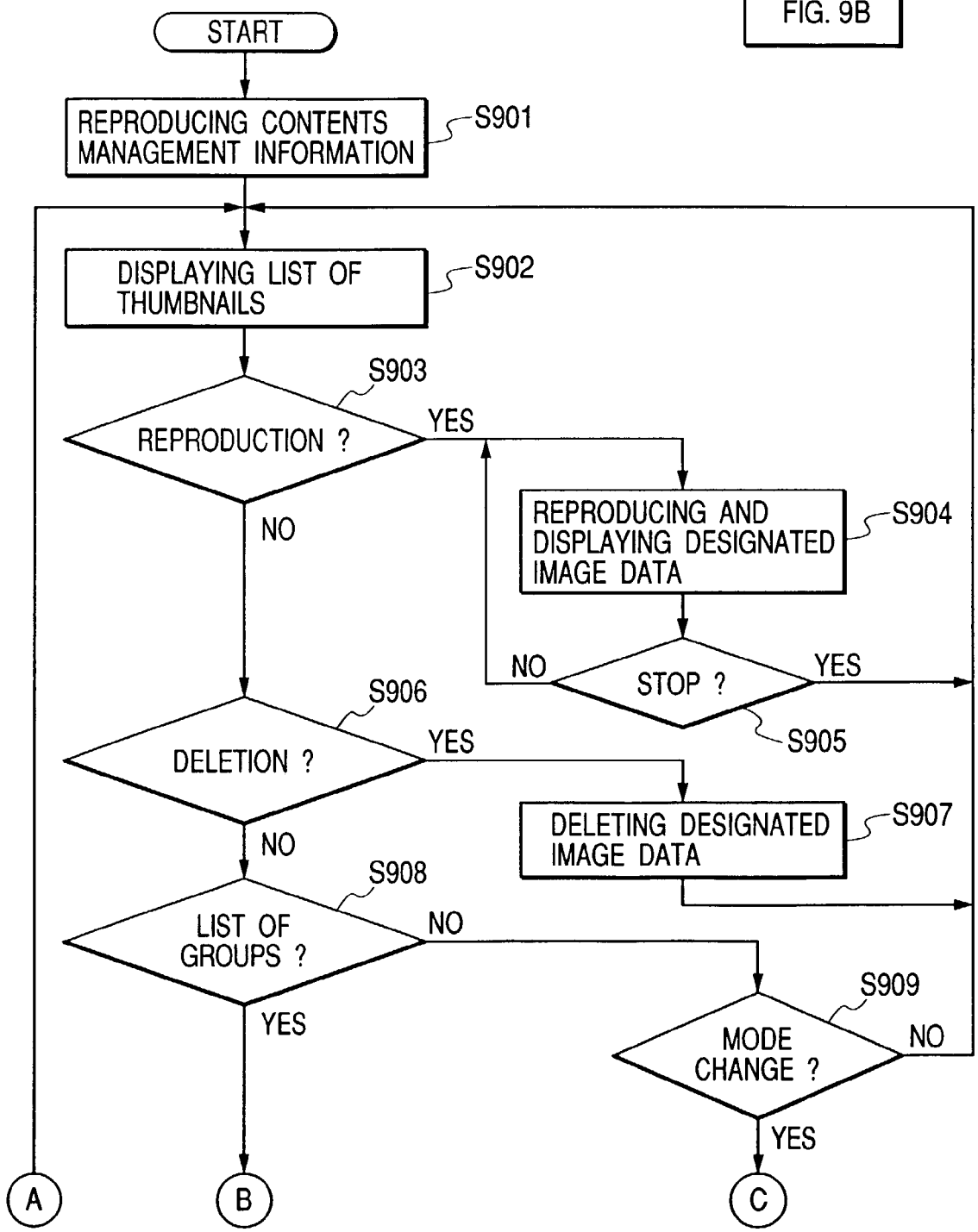

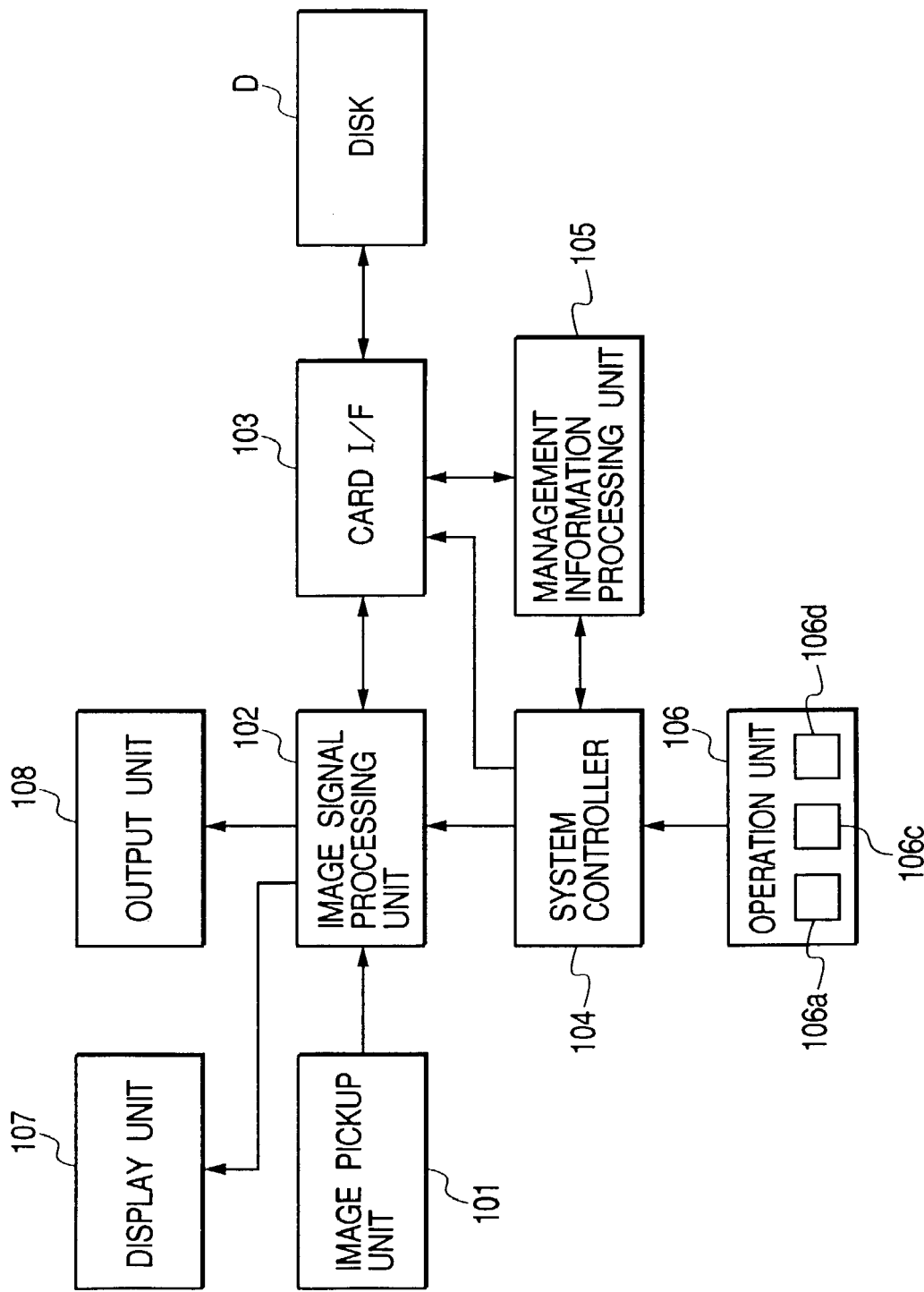

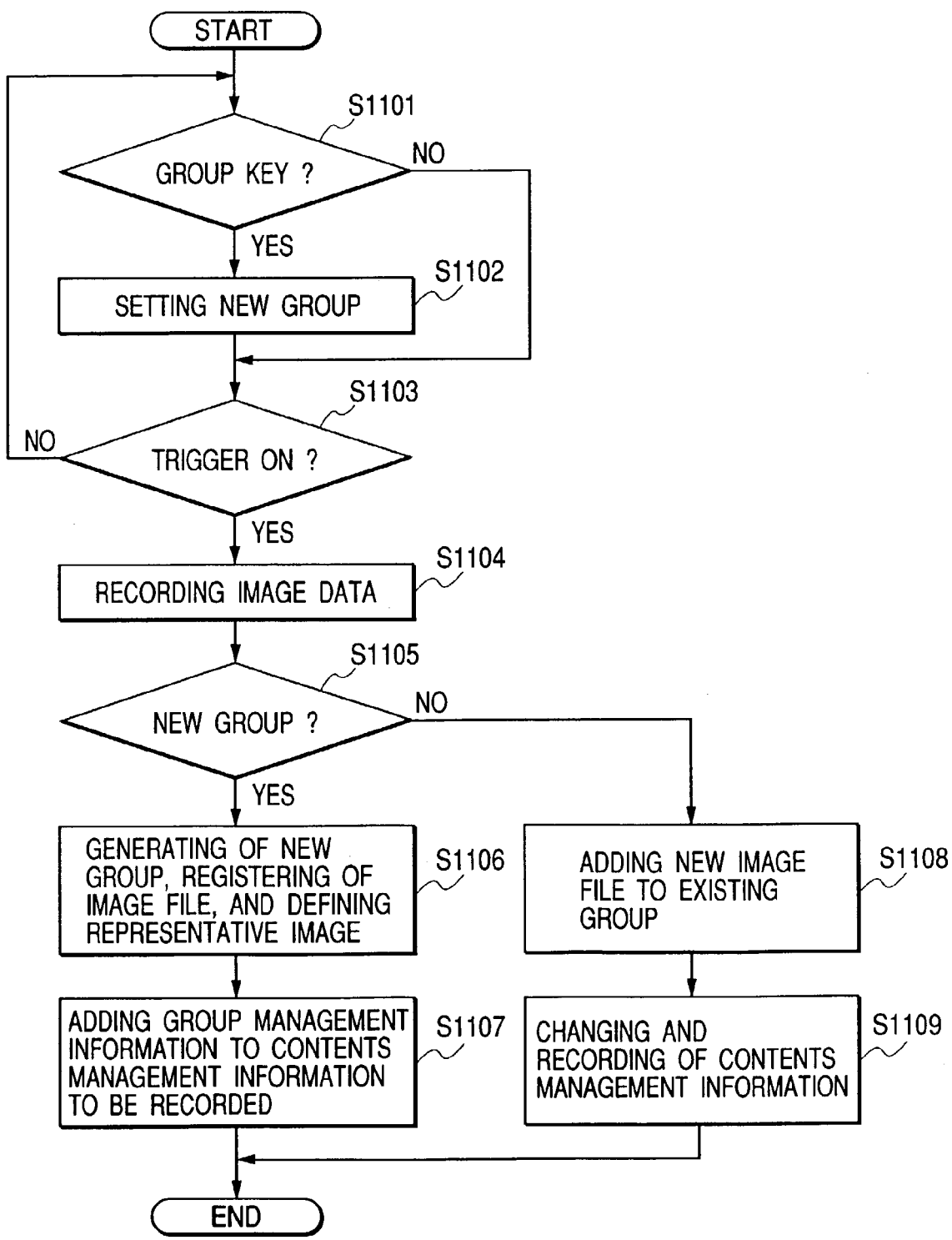

IMAGING APPARATUS WITH SELECTIVE ALLOCATION OF FIRST AND SECOND IMAGE DATA BASED ON OPERATION INSTRUCTION

BACKGROUND OF THE INVENTION

1. Field of the Invention

The present invention relates to an imaging apparatus, and more particularly to a process for grouping images that are photographed.

2. Related Background Art

Apparatuses for recording digital image data to, and reproducing the digital image data from, a memory card or an optical disk, such as digital cameras and digital disk recorders (hereinafter referred to as video cameras), are conventionally known. The storage capacity of each of the memory card and optical disk has increased dramatically in recent years, and it is possible with this type of video camera to record many image files on a storage medium such as the memory card or the optical disk.

For cases of performing photography, failures in framing, exposure, photography timing, and the like can be considered. If the video camera is provided with a large capacity memory card or optical disk, image taking is generally continued until a likable image is obtained.

In order to eliminate those types of photography failures, cameras have been devised which possess a function in which one frame image is taken into a temporary memory by depressing a shutter button halfway, and after this image is observed through a monitor, it is recorded in the memory card or the like when necessary, while recording to the memory card is prevented when unnecessary, or a function for displaying an image that has just been photographed, by a simple operation after image taking to decide whether the image should be deleted or not.

As stated above, it is necessary to find a desired image from among image data containing a large number of photographed images during reproduction, in case that the image data is recorded without deleting failed photography.

A function for lining up and displaying on the same screen a plurality of thumbnail images, in which the size of the image data recorded in the memory card is reduced, and searching for a desired image, is common in digital cameras at present. However, in case that a lot of images are thus recorded in the memory card as is, thumbnails of the failed images and thumbnails of the suitably photographed images are displayed in the same screen, this results in an extreme obstacle when searching for a desired image.

Dividing the image files into a plurality of groups based on the date of photography, the location of photography, and the like, and managing the image files per group can be considered.

However, if many image files are automatically grouped in accordance with date of photography, location of photography, and the like as stated above, the image files are not necessarily divided into groups intended by a user, and the convenience is poor.

On the other hand, with a method of storing the images into a temporary memory during photography, and then storing the images onto the memory card after their contents are checked, as discussed above, or with a method of determining whether or not to delete an image just photographed after confirmation, only those images that are desirable to the user can be recorded in the memory card. However, it is necessary for the user to verify on the spot whether or not a re-photographed image is truly a good image, and make an accurate judgement.

In addition, device miniaturization is advancing in recent-year digital cameras and the like, and there may be cases that checking up through detailed portions of an image on a small display liquid crystal monitor is difficult. Further, as to group pictures and the like, there are cases in which it is difficult to decide whether or not the photography desired has been accomplished, depending upon the subject.

Further, together with the increase in functionality of personal computers in recent years, image data photographed by digital cameras and the like is being loaded into personal computers, and retouching of the images is performed by using application software.

In order to generate a desired image by using a plurality of images in these circumstances, it is effective to also leave the failed images on the memory card and then use them. A method of saving the images including the failed images and retrieving them so as to be easily utilized when performing editing by personal computer later, is therefore preferable.

SUMMARY OF THE INVENTION

An object of the present invention is to solve those types of problems.

Another object of the present invention is to allow a user to easily manage a large number of image data files by using a simple operation.

In order to attain the above-mentioned objects, according to an aspect of the present invention, there is provided an imaging apparatus including:

image pickup means;

recording means for recording image data obtained by the image pickup unit onto a recording medium;

operation instructing means capable of arbitrary operations; and controlling means for allocating a first image data picked up by the image pickup means and a second image data picked up by the image pickup means immediately before the first image data, to a same group in accordance with an instruction from the operation instructing means, and for generating group information indicating the image data within the group.

Objects of the present invention other than those stated above, and their characteristics, become clear by the detailed explanation of the preferred embodiments of the present invention below, with reference to the drawings.

BRIEF DESCRIPTION OF THE DRAWINGS

FIG. 5 is a diagram showing states of user operation and photographed image during photography;

FIG. 6 is a diagram showing contents management information;

FIG. 10 is a diagram showing the structure of a video camera to which the present invention is applied;

FIG. 11 is a flowchart showing operation during photography; and

DETAILED DESCRIPTION OF THE PREFERRED EMBODIMENTS

Preferred embodiments of the present invention are explained in detail below using the diagrams.

Figure 1:
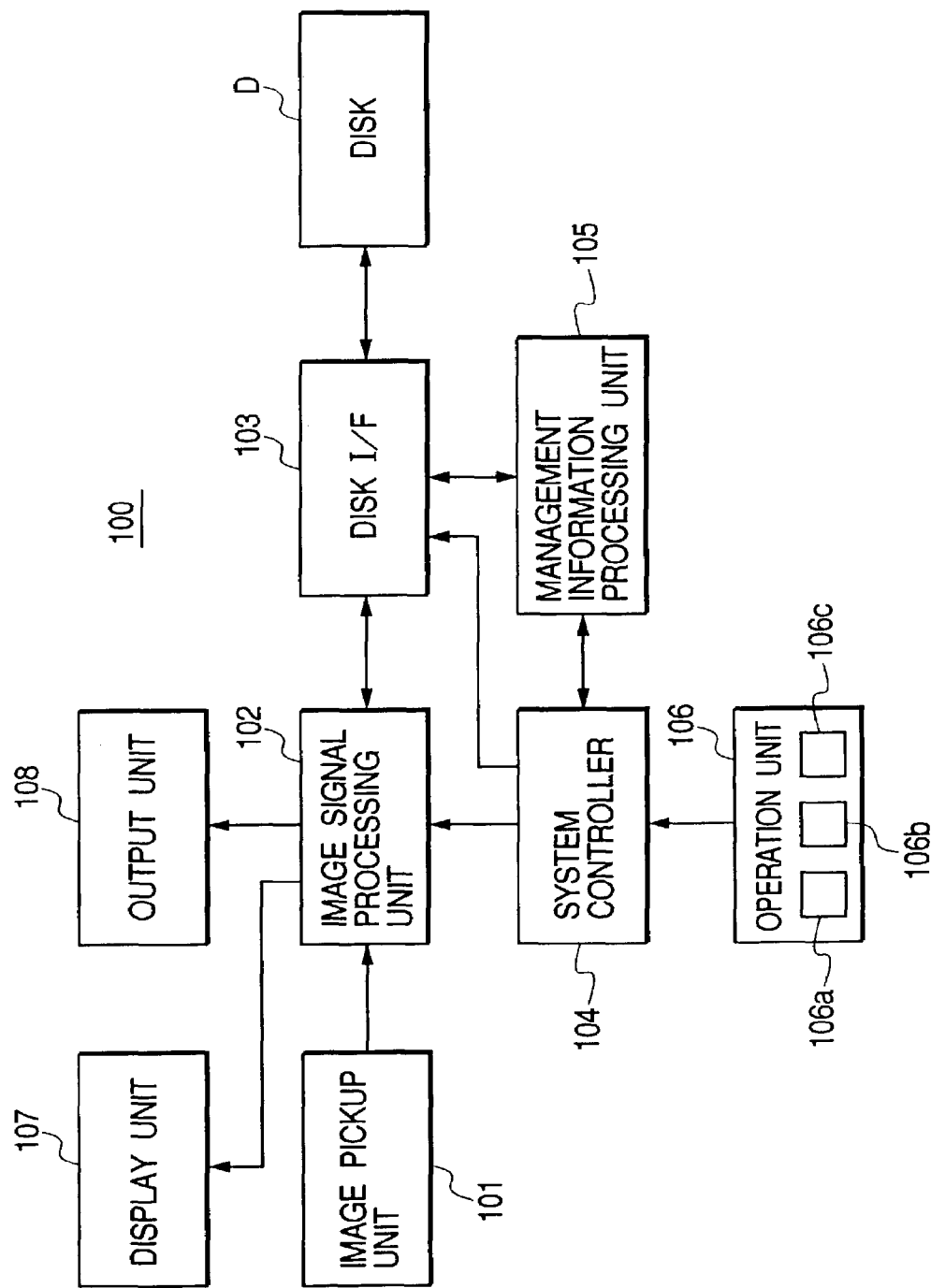
FIG. 1 is a diagram showing the structure of a video camera to which the present invention is applied.

FIG. 1 is a diagram showing the structure of a digital video camera recorder (hereinafter referred to as a video camera) to which the present invention is applied.

In FIG. 1, reference numeral 101 denotes an image pickup unit having a lens, a CCD, and the like, reference numeral 102 denotes an image signal processing unit for encoding an image signal from the image pickup unit 101, compressing the quantity of information in the encoded image signal, and decoding the reproduced image signal and expanding the quantity of information of the decoded image signal. Reference numeral 103 denotes a disk I/F for recording and reproducing image data and other data onto and from a disk D, the disk I/F having a known optical pickup or magnetic head, spindle motor, and the like. Reference numeral 104 denotes a system controller for controlling overall operations of the video camera 100, reference numeral 105 denotes a management information processing unit for processing group management information in order to manage groups among image files in accordance with this embodiment, and reference numeral 106 denotes an operation unit having a trigger key 106a, a re-photographing key 106b, a mode switch key 106c, and other operation keys. Reference numeral 107 denotes a display unit, and reference numeral 108 denotes an output unit for outputting image data obtained from the image pickup unit or reproduced image data to the outside.

Operation of the video camera of FIG. 1 during photography is explained next using the flowchart of FIGS. 2A and 2B.

Figures 2, 2A:
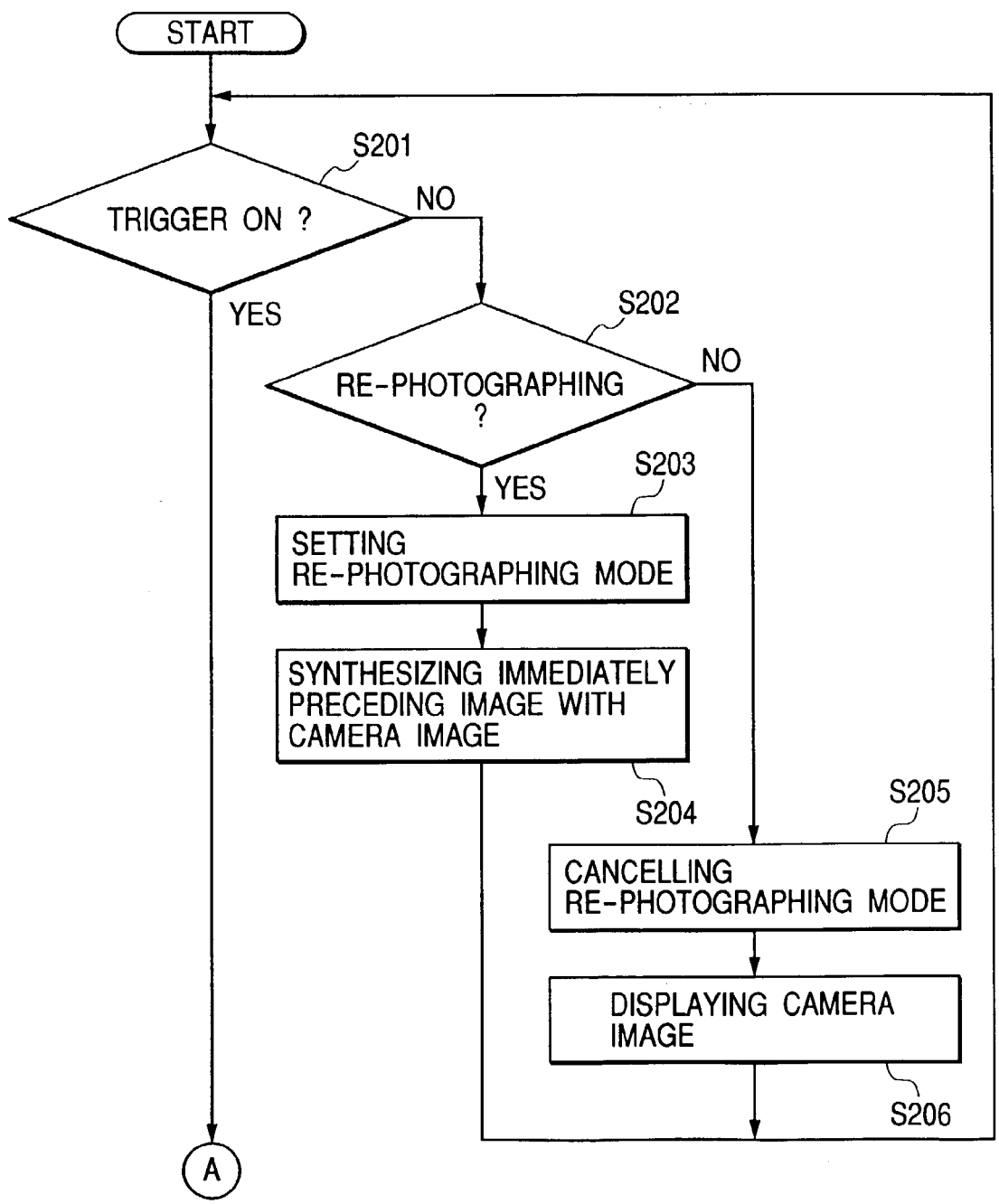
FIG. 2, composed of FIGS. 2A and 2B, is a flowchart showing operation during photography.
Figure 2B:
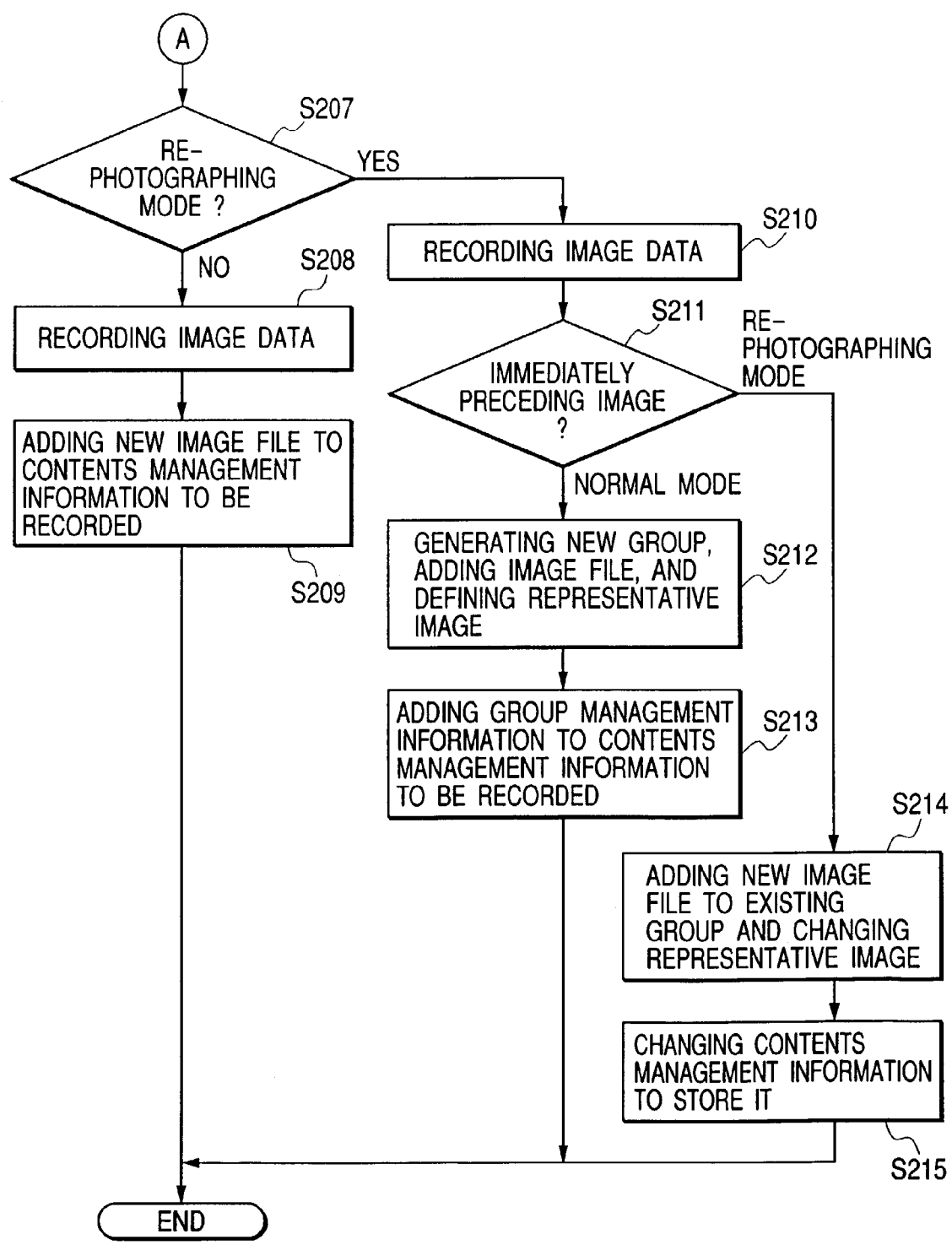

FIGS. 2A and 2B are flowcharts showing control by the system controller 104 in the photography mode. The flow of FIGS. 2A and 2B start when a user of FIG. 1 sets a camera mode by operating the mode switch key 106c.

In FIG. 2A, operation of the trigger key 106a is first confirmed in a step S201, and in case that the trigger key 106a is not operated, there is detected whether or not a re-photographing mode is set by the re-photographing key 106b in a step S202.

The image signal processing unit 102 is controlled so that, if the re-photographing mode is set, the system controller 104 sets the video camera mode to the re-photographing mode (a step S203), and further, makes a synthesis of a moving image obtained currently from the image pickup unit 101 and a still image photographed immediately before and stored in an internal memory of the image signal processing unit 102. The synthesized image is then displayed in the display unit 107 (a step S204).

Figure 3:
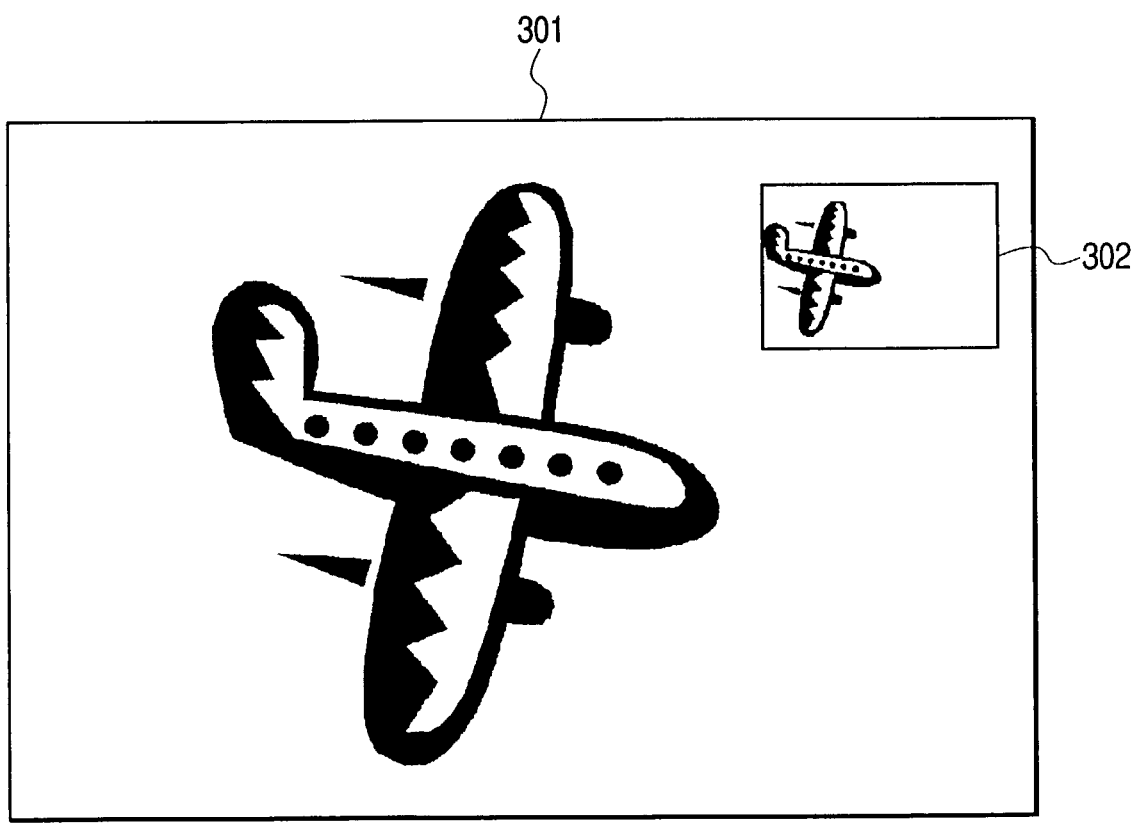
FIG. 3 is a diagram showing a display screen during a re-photographing mode.

The state of the image displayed in the display unit 107 at this point is shown in FIG. 3.

Reference numeral 301 of FIG. 3 denotes a display screen of the display unit 107, and an immediately-preceding still image 302 is synthesized and displayed in the display screen 301. By thus synthesizing and displaying the still image photographed immediately before, the user can understand that the re-photographing mode is set.

Note that an immediately preceding photographed image is not available immediately after turning on the electric power, nor in a state immediately after the mode is switched from the reproduction mode to the camera mode by using the mode switch key 106c. Setting the re-photographing mode by using the re-photographing key 106b is therefore made invalid, and this is displayed in the display unit 107.

On the other hand, in case tat the re-photographing key 106b is not operated, the re-photographing mode is cancelled (a step S205), and only an image from the image pickup unit 101 is displayed in the display unit 107 (a step S206).

Detection is made in a step S207 as to whether or not the re-photographing mode is set, if the trigger key 106a is operated in this condition.

The mode is judged to be a normal photography mode in case that the re-photographing mode is not set, and one frame of image data corresponding to an operation of the trigger key 106a is extracted from the moving image data output from the image pickup unit 101, is then encoded, and recorded on the disk D by the disk I/F 103 (a step S208).

The one frame of encoded still image data is recorded as one file on the disk D in this embodiment. Further, the system controller 104 controls the image signal processing unit 102, generates thumbnail image data in which the size of the image data to be recorded is compressed, encodes the thumbnail image data, and records the data on a predetermined location of the image file, such as a file header, footer, or the like.

Note that the trigger key 106a is a two-stroke release switch in the video camera 100 of this embodiment. The system controller 104 extracts one frame of image data in accordance with turn-on of a first stroke of the release switch, from the moving images from the image pickup unit 101, stores the one frame of image data in the memory within the image signal processing unit 102, and displays one frame of still image in the display unit 107. Operation then proceeds from the step S201 to the step S207 when a second stroke of the release switch is turned on in this state.

Further, if the first stroke of the release switch is turned off after being turned on without the second stroke of the release switch being turned on, the image data held in the internal memory is released, and the image signal processing unit 102 is controlled so as to display the image from the image pickup unit 101 once again.

In a step S208, the system controller 104 controls the management information processing unit 105 so as to add new image file information to contents management information after the image data file is recorded on the disk D (a step S209).

The term "contents management information" refers to information for managing the image files recorded on the disk D, and includes an ID, a date of photography, group information described later, and the like for each image file. This contents management information is recorded on the disk D by the disk I/F 103. The contents management information is recorded on the disk D as a different file from the image file in this embodiment.

Further, in case that the re-photographing mode is set in the step S207, one frame of image data corresponding to the operation of the trigger key 106a is read out from the image signal processing unit 102, and recorded on the disk D by the disk I/F 103 (a step S210). Next, which of the re-photographing mode and a normal mode is the photographing mode of the immediately-preceding image is detected in a step S211.

In case that the immediately-preceding image was photographed in the normal mode, the management information processing unit 105 is controlled so that new group management information is generated and an ID of the immediately-preceding photographed image data and an ID of the newly recorded image data are registered for the group. The new image data is then defined as a representative image of this group, and the ID of the representative image data is appended to the group management information (a step S212).

The group management information thus generated and the newly photographed image data information are then appended to the contents management information, and recorded on the disk D by the disk I/F 103 (a step S213).

On the other hand, in case that the immediately-preceding photographed image data is also picked up in the re-photographing mode in the step S211, the management information processing unit 105 is controlled so that the group management information is changed so as to add an ID of the newly photographed image data to the same group as the group to which the immediately-preceding image data is registered. In addition, the newly photographed image data is newly set as the representative image of this group, and the ID of the representative image data is changed to the ID of the new image data (a step S214).

The group management information thus generated, and the newly photographed image data are then appended to the contents management data, and recorded on the disk D by the disk I/F 103 (a step S215)

Figure 4:
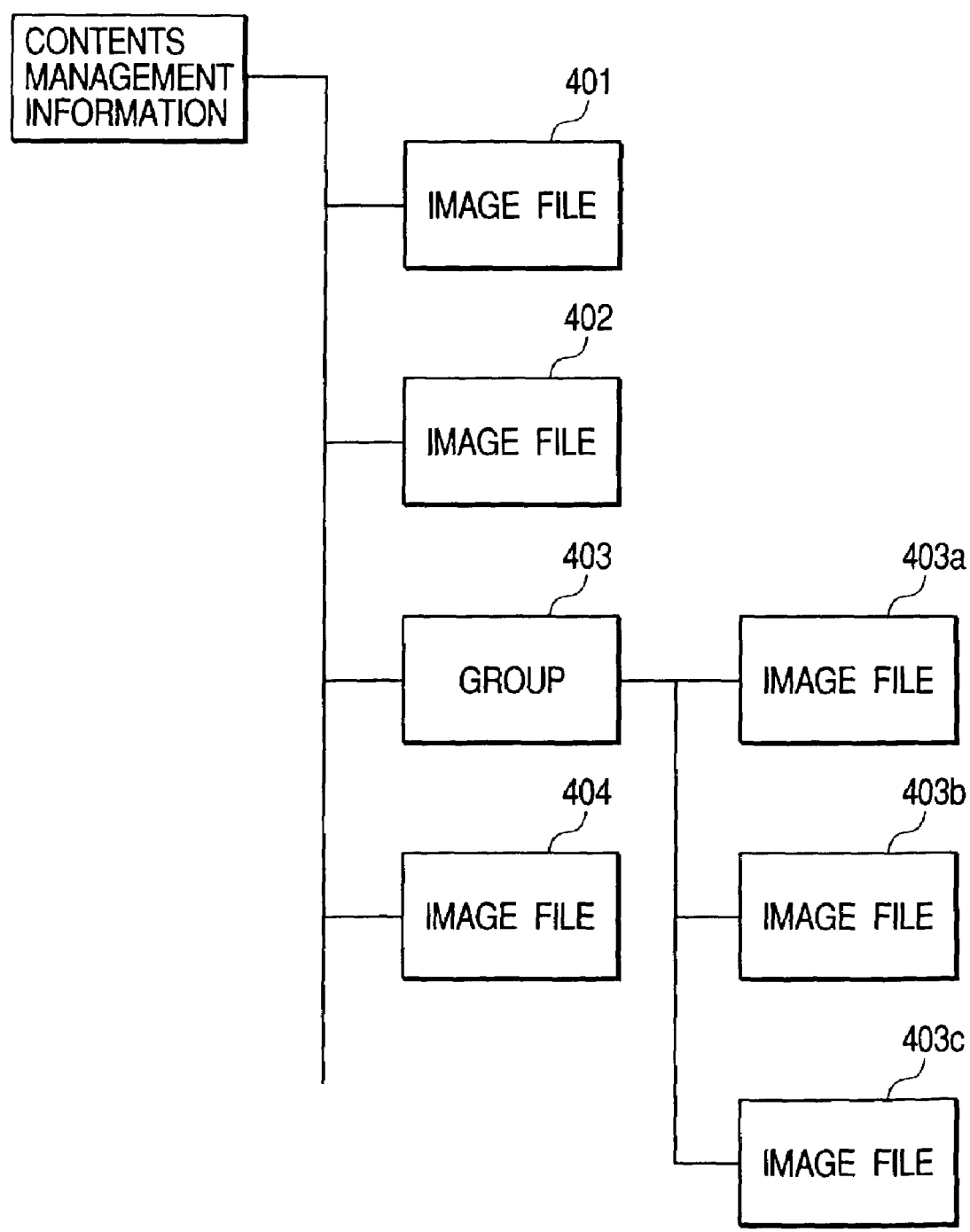
FIG. 4 is a diagram showing an image data recording state by contents management information.

FIG. 4 is a diagram showing a relationship between the image data recorded on the disk D in accordance with the contents management information.

As shown in FIG. 4, a group 403 that contains image data 403a, 403b, and 403c photographed by the re-photographing mode exists in parallel with image data 401, 402, and 404 photographed by the normal photography mode. The image data 403c, which is photographed lastly within the group 403, is defined as the representative image of the group 403 in FIG. 4. The reproduction order is then defined in accordance with the contents management information of FIG. 4 so that the image data 401, 402, 403c, and 404 are reproduced in this order during reproduction.

By thus operating the re-photographing key 106b before photographing to set the re-photographing mode, the group management information for treating the image data photographed next as the same group as the immediately-preceding photographed image data is generated and recorded on the disk D in this embodiment. There is regulated by the contents management information so that one group is treated in parallel with other image data recorded in the normal photography mode.

FIG. 5 is a diagram showing a relationship in accordance with this embodiment between user operations and image data to be recorded.

Reference numerals 501, 503, and 505 in FIG. 5 each denote a shutter operation, and image data 502, 504, and 506 are recorded by these shutter operations. If there is a re-photographing operation 507 after recording the image data 506, the system controller 104 switches the camera 100 to the re-photographing mode. A next image data 510 is recorded when a shutter operation 508 is made in this state. An image data 510 is registered at this point in a group 517 that is the same group as that of the immediately preceding recorded image data 506, and is positioned as an image existing in parallel with the image data 506 in the time sequence.

The image data thus photographed by the shutter operation 508 in the re-photographing mode is not treated as the next image 509 of the immediately-preceding image data 506 in the time sequence, and further, the image data 510 after re-photographing is defined as the representative image of the group 517 and newly set as the next image after the image 504.

Additionally, if there is a re-photographing operation 511 after photographing the image 510, the next image 513 is also photographed in the re-photographing mode. As a result, an image data 514 photographed by a shutter operation 512 is registered in the same group 517 as that of the images 506 and 510 that were photographed immediately before the image data 514, and is positioned as an image existing in parallel with the images 506 and 510 in the time sequence.

That is, the image data photographed by the shutter operation 512 is not treated as the next image of the immediately-preceding image 510, and the image data 514 after re-photographing is newly defined as the representative image of the group 517, and newly set as the next image of the image 504.

Next, if there is a shutter operation 515 after photography of the image 514 without performing a re-photographing operation, the image data photographed by the shutter operation 515 is recorded in the normal photography mode. An image 516 is then defined as the next image of the group 517, that is, the next image data of the image data 514 which is the representative image of the group 517 here.

A time sequence order of the image data of FIG. 5 is defined in the order indicated with an arrow 518 as a result of the above-mentioned photographing.

FIG. 6 is a diagram showing a state of the contents management information in this embodiment.

IDs, recording location (address), and quantity of information for all files including the image data files recorded on the disk D, are described in contents information in FIG. 6. The recorded image data files and group photographing order IDs are described in file management information. IDs of groups recorded (set) on the disk D are described in group information. Further, the IDs of the image files registered in each group and the ID of the representative image data of the group are described in file information within the group. Two groups are set in the example of FIG. 6.

Note that the contents management information is recorded in a predetermined location of the disk D, for example, in a predetermined number of tracks of the innermost circumferential side.

Processing during reproduction is explained next.

In case that the reproduction mode is set by the mode key 106c, the system controller 104 controls the disk I/F 103 so that the contents management information is reproduced by the disk D. The contents management information reproduced by the disk I/F 103 is output to the management information processing unit 105, and stored in the internal memory. The system controller 104 controls the disk I/F 103, the image signal processing unit 102, and the display unit 107 so as to read out thumbnail image data of the image files and thumbnail image data of the group representative images, recorded on the disk D, on the basis of the contents management information, and display the data arranged in the order designated in the file management information.

Figure 7:
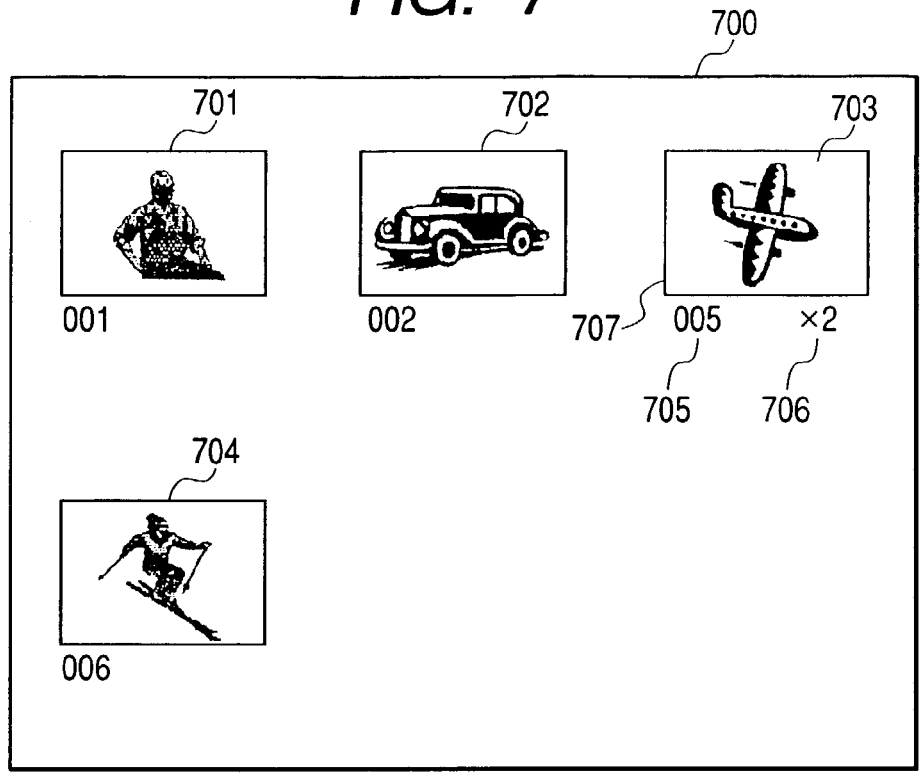
FIG. 7 is a diagram showing an entire list of thumbnails screen.

FIG. 7 is a diagram showing a state of a list of thumbnails screen 700 displayed during the reproduction mode for the disk D in which image data like that of FIG. 5 is recorded.

In FIG. 7, thumbnail images 701, 702, and 704 are thumbnail images of the image data 502, 504, and 516 of FIG. 5, respectively, and a thumbnail image 703 is a thumbnail image of the image data 514, which is the representative image of the group 517. Image numbers 705 are displayed beneath each of the thumbnail images, and further, group information 706 showing that the thumbnail 703 is a group representative image and that there are two other images existing in the same group, is displayed beneath the group representative image thumbnail 703.

Through the above-mentioned display, it thus becomes possible for the user to easily recognize by merely verifying the thumbnail screen that group photographed in the re-photographing mode exists on the disk D, and the number of the image data registered in each of the groups.

If the user operates an cursor key (not shown) of the operation unit 106 while the thumbnail images are thus displayed, and operates the reproduction key after moving a cursor image 707 to a desired thumbnail image, the system controller 104 will control the disk I/F 103 and the image signal process unit 102 so that the image data file corresponding to the designated thumbnail is reproduced from the disk D and displayed instead of the list of thumbnails.

Further, in case that a group display key (not shown) is operated after moving the cursor 707 to the group representative thumbnail, the system controller 104 controls the disk I/F 103 and the image signal processing unit 102 so as to read out intra-group of the group designated by the management information processing unit 105, and read out and display as a summary the thumbnail images of all the image data registered within the same group.

Figure 8:
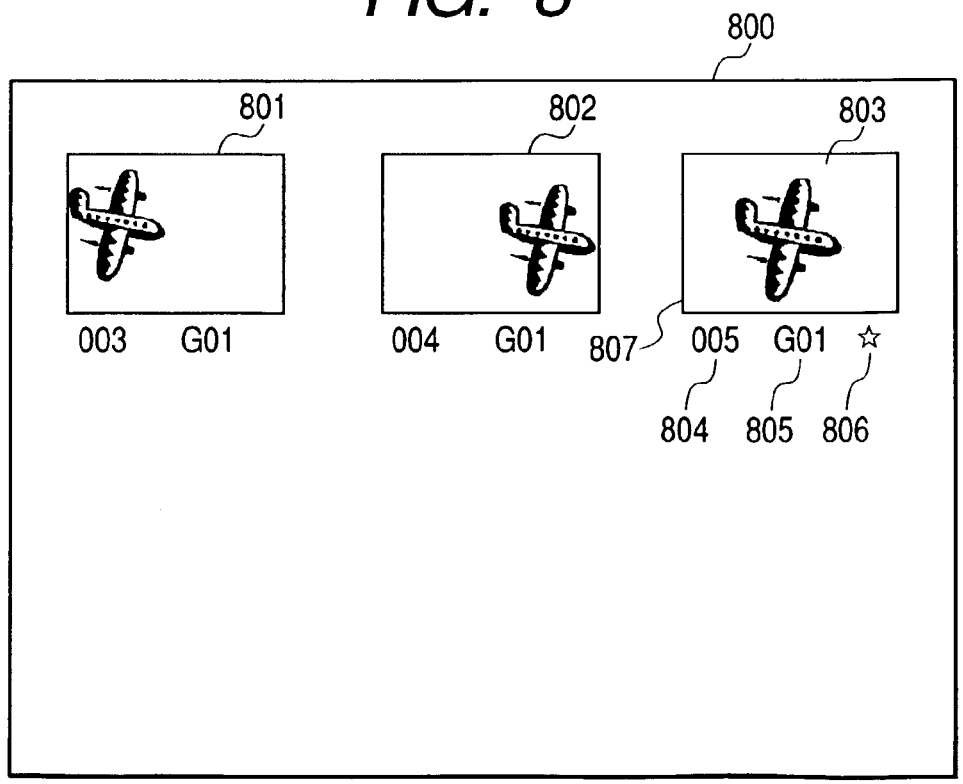
FIG. 8 is a diagram showing a list of thumbnails of the group screen.

FIG. 8 is a diagram showing a state of a list of thumbnails of the group screen 800.

In FIG. 8, thumbnail images 801, 802, and 803 of three image data registered in a selected group are displayed, and further, image number information 804 and group number information 805 are displayed beneath each of the thumbnail images. Further, information 806 denoting a representative image is displayed beneath the group representative image thumbnail 803.

It is possible for the user to change the representative image and to delete the image data by operating the operation unit 106 while this screen is displayed.

That is, in case that the user operates a registration key of the operation unit 106 after moving the cursor 807 when the list of groups screen of FIG. 8 is displayed, the system controller 104 then instructs the management information processing unit 105 to change the representative image of the group to the designated image. The management information processing unit 105 receives this instruction and changes the ID of the representative image data in the intra-group file information within the contents management information to the designated ID, outputs the ID to the disk I/F 103, which records it on the disk D.

Further, it becomes possible to delete a designated image from the disk D by the user's operating a deletion key of the operation unit 106 after moving the cursor image when the list screen of FIG. 7 or FIG. 8 is displayed.

The above processes are explained next by using flowcharts of FIGS. 9A and 9B.

Figure 9B:
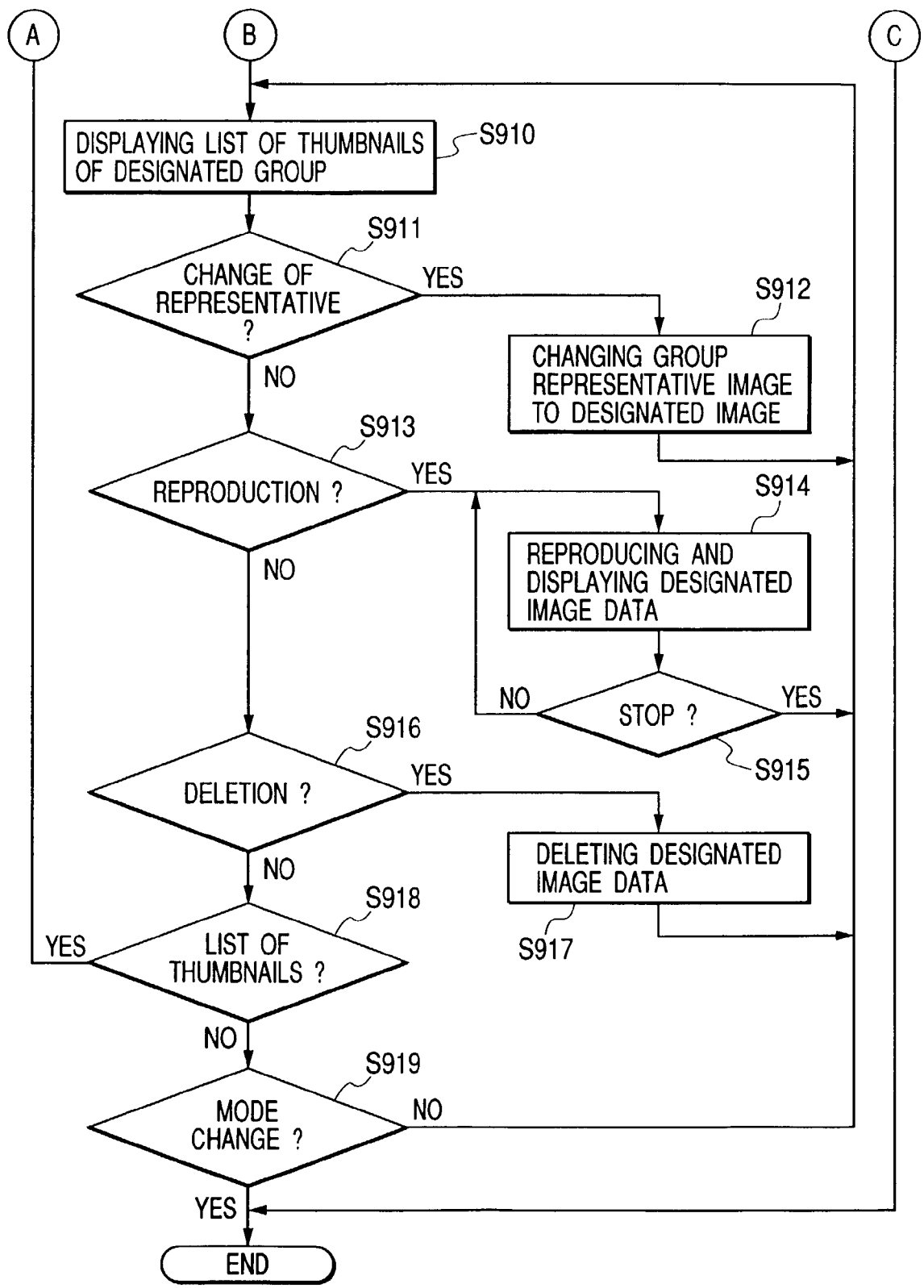
FIG. 9, composed of FIGS. 9A and 9B, is a flowchart showing operation during reproduction.

FIGS. 9A and 9B are flowcharts showing processes of the system controller 104 in the reproduction mode.

When the video camera 100 is put into the reproduction mode, the contents management information is reproduced from the disk D and output to the management information processing unit 105 (a step S901). The thumbnail image data of each image data file and the group representative image data is then reproduced from the disk D based on this contents management information, and a list screen of thumbnail images like those of FIG. 7 is displayed in the display unit 107 (a step S902).

In case that the reproduction key is operated in this state (a step S903), the image data that corresponds to the thumbnail image designated by the cursor at this point is reproduced from the disk D and displayed in the display unit 107 (a step S904). The display thereafter returns to the list screen display of the step S902 if there is a reproduction stop instruction (a step S905).

Further, in case that a deletion key is operated while the list of thumbnails screen is displayed (a step S906), the image data designated by the cursor is deleted from the disk D (a step S907). In ease that the designated image data is a group representative image at this time, the management information processing unit 105 is controlled so that other image data among the image data of the same group as the group to which the designated image data is registered, for example, the image data photographed lastly within the same group, is set as the representative image of this group.

Further, in case that a group display key is operated when the list of thumbnails screen is displayed (a step S908), the thumbnail image data of the image data files registered in the designated group are reproduced from the disk D, and a list of thumbnails of the group is displayed in the display unit 107 instead of the list of thumbnails display (a step S910).

When there is provided an instruction to change the representative image while the list of thumbnails of the group is displayed (a step S911), after the management information processing unit 105 is controlled so as to change the group representative image to the designated image (a step S912), operation again returns to the step S910 and the representative screen information 806 shown in FIG. 8 is added beneath the newly designated representative image thumbnail and displayed.

Further, when the reproduction key is operated (a step S913), the designated image data is reproduced from the disk D and displayed (a step S914). In case that there is provided a reproduction stop instruction thereafter, the display returns to the list display of thumbnails of the group in the step S910 (a step S915).

Further, when the deletion key is operated while the list of thumbnails of the group screen is displayed (a step S916), the image data designated by the cursor is deleted from the disk D (the step S917). In case that the designated image data is a group representative image, the management information processing unit 105 is controlled so that other image data among the image data of the same group as the group to which the designated image data is registered, for example, the image data photographed lastly within the same group, is set as the representative image of this group.

When there is provided an instruction to display the overall list of thumbnails screen again while the list of thumbnails of the group screen is displayed, operation returns to the step S902, and the overall list of thumbnails screen is displayed (a step S918). Further., when there is provided an instruction to switch from the reproduction mode, the list of thumbnails of the group screen is deleted, ending its display (a step S919).

Further, in a step S909, if there is a mode switch instruction while the overall list of thumbnails screen is displayed, the overall list of thumbnails screen is deleted, ending its display (the step S909).

As described above, in this embodiment, a plurality of image data photographed in the re-photographing mode are all thus recorded on the disk as the same group, and therefore it is not necessary for the user to determine whether or not to leave the image data on the disk during photography, and photography can be performed in comfort.

By displaying only the designated representative image within the same group as a thumbnail image during reproduction, it then also becomes possible to easily retrieve in case that many images are photographed in the re-photographing mode.

A second embodiment of the present invention is explained next.

A plurality of image data photographed in the re-photographing mode by operating the re-photographing key are treated as one group in the above-discussed embodiment. In this embodiment, however, a group key is provided in place of the re-photographing key, and not only can simple re-photographing be accomplished, but it is also possible to classify photographed images into arbitrary groups by simple operations.

FIG. 10 is a diagram showing the structure of the video camera 100 applied in this embodiment, and the structure is similar to that of FIG. 1, except that a group key 106d is provided in place of the re-photographing key 106b of FIG. 1.

Operation in the video camera of FIG. 10 during photographing is explained next using FIG. 11. FIG. 11 is a flowchart showing process of the system controller 104 during photographing.

A recording pause state starts when the photographing mode is set by the mode key 106c, a moving image obtained by the image pickup unit 101 is then displayed in the display unit 107 to detect operation of the group key 106d (a step S1101). When the group key 106d is operated, a new group is set from the image to be photographed next (a step S1102). In case that there is no operation of the group key 106d in the recording pause state, the group presently set is retained as it is. Note that in this embodiment, new groups are set in the same way when the electric power is turned on.

When the recording trigger key 106a is operated (a step S1103), one frame of image data is extracted from the moving image data output from the image pickup unit 101 by the image signal processing unit 102 and then encoded. Thumbnail image data is generated by reducing a size of this one frame of image data, and the thumbnail image data is recorded on the disk D by the disk I/F 103 (a step S1104).

Whether or not a new group is set is detected next (a step S1105) to generate new group management information in case that a new group is set, and an ID of the image data now photographed is registered in this new group. Further, the newly photographed image is defined as a representative image of this group, and an ID of the representative image data is registered (a step S1106). This group management information is then added to the contents management information and recorded on the disk D (a step S1107).

On the other hand a new group is not set in the step S1106, the ID of the newly photographed image data is added to the group currently set, that is, the same group as that of the image data photographed immediately before the group currently set (a step S1108), and the contents management information is changed and recorded on the disk D (a step S1109).

Figure 12:
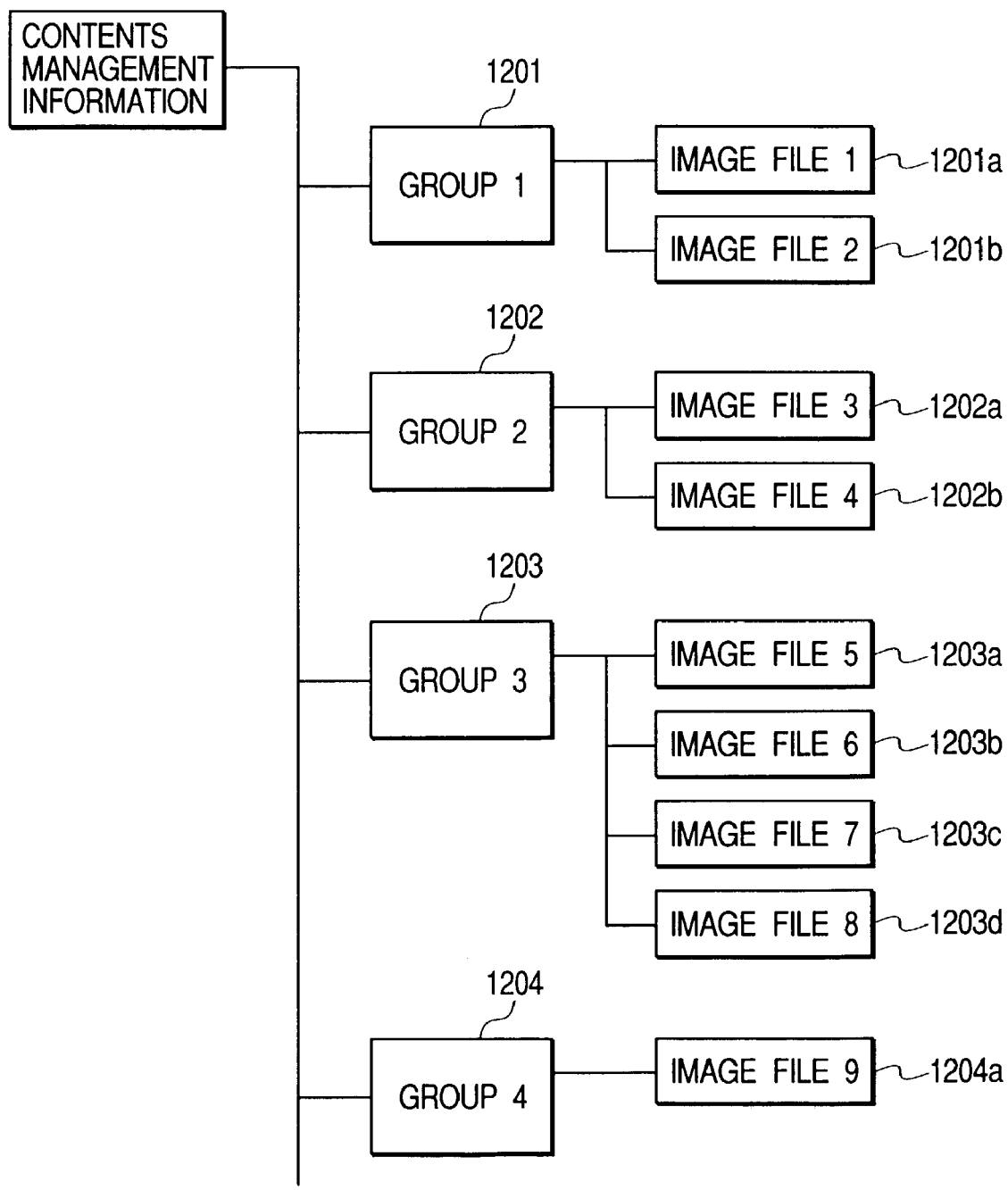
FIG. 12 is a diagram showing an image data recording state with contents management information.

FIG. 12 is a diagram showing relationships between the image data recorded on the disk D by the contents management information. In accordance with FIG. 12, groups 1201, 1202, 1203, and 1204 exist on the disk D. Two image files are registered in each of the groups 1201 and 1202, four image files are registered in the group 1203, and one image file is registered in the group 1204. Image files 1201a, 1202a, 1203a, and 1204a photographed first in their respective groups are then defined as the representative image data of their groups. In accordance with the contents management information of FIG. 12, the reproduction order is defined so that only the representative images of the groups 1201, 1202, 1203, and 1204 are reproduced in order during reproduction.

Processes of the disk D, whereon the image data are thus recorded, to be performed during reproduction are the same as those of the first embodiment mode, and only the representative image thumbnails of each group are displayed together with name information for the groups in the overall list of thumbnails screen.

Further, in case that the user selects the representative image thumbnail of a desired group and designates list of groups display, the thumbnail images of the image data of the designated group are displayed in a list, and it is therefore possible to perform a process for changing the representative image, a process for deleting the image data, and the like.

It thus becomes possible in this embodiment to treat a large number of image data to classify into groups intended by the user by simple operations in which the group key is operated before photographing, in case that the large number of image data are photographed.

Further, in this embodiment, a new group is set when the group key is operated, and therefore it is not necessary to operate the group key at the time of each photography in order to register into the same group.

Further, the images can be grouped freely by the user's intention by operating the group key, differing from automatic grouping by date of photography, location of photography, photographic mode, and the like.

Note that, although an apparatus for recording still image data is explained in the above embodiment, it is also possible to similarly apply the present invention to cases in which moving image data is recorded.

Further, although allotment to the groups is performed by operating the group key before photographing in the aforementioned embodiment, a structure in which the group key is operated after photography may also be used. In this case, a structure may also be used in which, for example, a certain image is allocated to the same group as the immediately-preceding photographed image by operating the group key during a period from after the certain image is photographed until the next image is photographed.

Further, although a case of applying the present invention to a video camera that records and reproduces image data and voice data to and from a disk medium is explained in the aforementioned embodiment modes, it is also possible to employ a recording medium that uses semiconductor memory, such as a memory card.

Further, storage medium such as ROMs, RAMs, memory cards, CD-ROMs, and the like with control programs stored therein for achieving the functions shown in FIGS. 2A, 2B, FIGS. 9A, 9B, or FIG. 11 in the aforementioned embodiment modes are also included in the present invention.

As explained above, it becomes possible to treat image data photographed in succession as the same group through simple operations in accordance with the present invention, and a large amount of image data can be managed easily.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:
   image pickup means;
   recording means for recording image data obtained by the image pickup means onto a recording medium;
   operation instructing means capable of arbitrary operations; and
   controlling means for allocating a first image data picked up by said image pickup means, and a second image data picked up by said image pickup means immediately before the first image data, to a same group in case that an instruction from said operation instructing means is issued between photographing of the second image data and photographing of the first image data, and for generating group information indicating the image data of the group, said controlling means inhibiting to allocate the first image data and the second image data to the same group in case that the instruction from said operation instructing means is absent between photographing of the second image data and photographing of the first image data.

2. An imaging apparatus according to claim 1, wherein said controlling means allocates the first image data and the second image data to the same group in case that there is an instruction from the operation instructing means before pick up of the first image data.

3. An imaging apparatus according to claim 1, wherein said controlling means determines a representative image data from a plurality of image data of the same group, and adds representative image information that indicates the representative image data to the group information.

4. An imaging apparatus according to claim 3, wherein said controlling means changes the representative image to another image data of the same group in response to a representative image change instruction.

5. An imaging apparatus according to claim 3, wherein said controlling means sets image data picked up lastly within the same group as the representative image data.

6. An imaging apparatus according to claim 1, further comprising:
   display means for displaying images relating to image data obtained by said image pickup means,
   wherein said display means superimposes and displays one image relating to image data output from said image pickup means and an another image relating to image data picked up immediately before the one image, in response to an instruction from the operation instructing means.

7. An imaging apparatus according to claim 1, wherein said recording means generates thumbnail image data of the image data, and records the thumbnail image data onto the recording medium.

8. An imaging apparatus according to claim 7, further comprising:
   reproducing means for reproducing the image data and the thumbnail image data from the recording medium; and
   display means for displaying images relating to the reproduced image data,
   wherein said controlling means controls said display means so as to display only a thumbnail image of a designated representative image data from among a plurality of image data within the same group.

9. An imaging apparatus according to claim 8, wherein said controlling means controls said display means so as to display, from among a plurality of image data recorded in the recording medium, thumbnail images of image data which is not allocated to any group, and the thumbnail image of the representative image data of the group, on the same screen.

10. An imaging apparatus according to claim 9, wherein said controlling moans controls said display means so as to add and display information indicating that the thumbnail image of the representative image data is a representative of the group.

11. An imaging apparatus according to claim 9, wherein said controlling means controls said display moans so as to display the thumbnail images of the plurality of image data of the group on the same screen in response to an instruction for displaying a list of the image data of the group.

12. An imaging apparatus according to claim 1, wherein said operation instructing means is constructed with a single operation key.

13. An imaging apparatus comprising:
    image pickup means;
    recording means for recording image data obtained by said image pickup means onto a recording medium;
    operation instructing means for arbitrarily instructing that image data photographed by said image pickup means be grouped; and
    controlling means for allocating image data recorded by the recording means during a period from an instruction from the instructing moans to the next instruction, to a same group, and for generating management information that indicates the image data of the group and a representative image among a plurality of images of the group, said controlling means generating a new group different from each of the groups to which the image data already recorded onto the recording medium are allocated, at every operation of said operation instruction means.

14. An imaging apparatus according to claim 13, wherein said recording moans records the image data together with thumbnail image data that indicates a thumbnail image of the image data onto the recording medium.

15. An imaging apparatus according to claim 14, further comprising:
    reproducing means for reproducing the image data and the thumbnail image data from the recording medium; and
    display means for displaying images relating to the reproduced image data,
    wherein said controlling means controls said display means so as to display a list of only thumbnail images of designated representative images, from among the image data of a plurality of groups recorded on the recording medium.

16. An imaging apparatus according to claim 15, wherein said controlling means specifies image data picked up first, from among the plurality of image data of the same group, as a representative image data.

17. An imaging apparatus according to claim 16, wherein said continuing means changes the representative image data to another image data within the same group in response to a representative image change instruction.

18. An imaging apparatus according to claim 13, further comprising:
    recording instructing means for instructing that the image data be recorded by the recording means,
    wherein said operation instructing means is constructed with an operation key different from said recording instructing means.

19. An imaging apparatus according to claim 13, wherein said operation instructing means is constructed with a single operation key.

20. A signal processing method tat is a method of recording image data obtained by an image pickup means onto a recording medium, comprising:

allocating a first image data picked up by said image pickup means and a second image data picked up by said image pickup means immediately before the first image data to a same group, so as to allocate the first image data to the same group as the image data picked up immediately before the first image data, in case that an arbitrary instruction from an instructing operating means capable of operation is issued between photographing of the second image data and photographing of the first image data, and generating management information containing group information indicating the image data of the group, wherein said allocating and generating includes inhibiting to allocate the first image data and the second image data to the same group in case that the instruction from said operation instructing means is absent between photographing of the second image data and photographing of the first image data.

21. A signal processing method that is a method of recording image data obtained by an image pickup means onto a recording medium, comprising:

allocating image data recorded by the recording means to a same group during a period from an instruction by an operation instructing means to arbitrarily instructing tat the image data picked up by said image pickup means be grouped, until the next instruction, and generating management information containing group information that indicates the image data of the group and a representative image among a plurality of images of the group, wherein said allocating and generating includes generating a new group different from each of the groups to which the image data already recorded onto the recording medium are allocated at every operation of said operation instruction means.

* * * * *